US006184607B1

(12) United States Patent
Cabuz et al.

(10) Patent No.: US 6,184,607 B1
(45) Date of Patent: Feb. 6, 2001

(54) DRIVING STRATEGY FOR NON-PARALLEL ARRAYS OF ELECTROSTATIC ACTUATORS SHARING A COMMON ELECTRODE

(75) Inventors: Cleopatra Cabuz; Eugen I. Cabuz, both of Edina, MN (US)

(73) Assignee: Honeywell International Inc., Morristown, NJ (US)

( * ) Notice: Under 35 U.S.C. 154(b), the term of this patent shall be extended for 0 days.

(21) Appl. No.: 09/223,082

(22) Filed: Dec. 29, 1998

(51) Int. Cl.$^7$ ...................................................... H02N 1/00
(52) U.S. Cl. ............................................................. 310/309
(58) Field of Search ............................................. 310/309

(56) References Cited

U.S. PATENT DOCUMENTS

| | | | |
|---|---|---|---|
| 2,975,307 | * 3/1961 | Shroeder et al. | 310/309 |
| 3,641,373 | * 2/1972 | Elkuch | 310/309 |
| 3,769,531 | * 10/1973 | Elkuch | 310/309 |
| 5,176,358 | 1/1993 | Bonne et al. | 251/30.05 |
| 5,206,557 | * 4/1993 | Bobbio | 310/309 |
| 5,541,465 | * 7/1996 | Higuchi et al. | 310/309 |
| 5,552,654 | 9/1996 | Konno et al. | 310/309 |
| 5,642,015 | * 6/1997 | Whitehead et al. | 310/309 |

FOREIGN PATENT DOCUMENTS

| | | | |
|---|---|---|---|
| 0744821A | 11/1996 | (EP) | H02N/1/00 |
| 5-219760 | * 8/1993 | (JP) | 310/309 |
| 744877 | * 6/1980 | (SU) | 310/309 |

OTHER PUBLICATIONS

C. Cabuz, et al., "High Reliability Touch–Mode Electrostatic Actuators", Technical Digest of the Solid State Sensor and Actuator Workshop, Hilton Head, S.C., Jun. 8–11, 1998, pp. 296–299.

C. Cabuz, "Tradeoffs in MOEMS Materials" Proceedings of the SPIE, vol. 2881, pp. 160–170, Austin, TX.

Minami K et al: "Fabrication of Distributed Electrostatic Micro Actuator (DEMA)" Journal of Microelectromechanical Systems, US, IEEE Inc. New York, vol. 2, No. 3, Sep. 1, 1993 (1993–09–01), pp. 121–127, XP000426532, ISSN: 1057–7157.

"Large–Scale Linearization Circuit For Electrostatic Motors" IBM Technical Disclosure Bulletin, US, IBM Corp. New York, vol. 37, No. 10, Oct. 1, 1994 (1994–10–01) pp. 563–564, XP000475777, ISN: 0018–8689.

\* cited by examiner

*Primary Examiner*—Thomas M. Dougherty
(74) *Attorney, Agent, or Firm*—John G. Shudy, Jr.

(57) ABSTRACT

An electrostatic actuator array having at least one cell, in which the individual cells share a common electrode. Each cell includes first and second electrodes separated by a distance and having a moveable diaphragm mounted there between for conducting a voltage potential thereto. One of the pair is movable with respect to the other, and the pair are positioned to move upon application of a voltage potential thereto by electrodes attached thereto. A voltage potential producing an alternate polarity field generated from a single DC power supply is selectively provided to the electrodes to cause the movement. The preferred signals from the power supply are uni-polar square wave signals, preferably deriving the alternate polarity field from a DC current having time allocation of signals to present alternating fields to each actuator. The individual cells are configured in an actuator array wherein some cells operate out of phase with adjoining cells. The plurality of actuation cells equals n, having 2n electrodes, where n is an integer of at least 2. A preferred actuator array comprises n actuation cells working out of phase with 2n electrodes driven with n+1 unipolar signals.

18 Claims, 4 Drawing Sheets

DRIVING STRATEGY FOR NON-PARALLEL ARRAYS OF ELECTROSTATIC ACTUATORS SHARING A COMMON ELECTRODE

FIELD OF THE INVENTION

The present invention relates to an electrostatic actuator array in which the individual cells share a common electrode and wherein an alternate polarity field is generated from a single DC power supply. More particularly the invention relates to a driving means for such an array, wherein an alternate polarity field is derived from a DC current having time allocation of signals to present alternating fields to each actuator.

BACKGROUND OF THE INVENTION

Electrostatic actuators have become selected and are the solution of choice for actuators that employ low power, operate at high speed, require low cost to produce, and are of small size. These devices present significant advantages: over thermal devices by requiring much less power; over electromagnetic devices by using less power and having smaller size; over piezoelectric actuators that have a higher cost and have a much smaller amplitude of motion.

To date, however, there are no commercially available electrostatic actuators. Of particular concern are electrostatic actuation in the presence of dielectrically isolated electrodes, where specific problems are incurred.

In electrostatic actuators, the desired displacement is the result of the attractive electrostatic force generated by the interaction between a distribution of opposite sign charges placed on two bodies, at least one of which is moveable. For the purposes of this invention, these two bodies are known as actuator plates. The actuator plates are placed apart by a predetermined distance. The charge distribution is then generated by applying a potential difference between two conductive electrodes that are part of the actuator plates. The actuator will be in the ON state or mode when a potential difference is applied between the electrodes and the two plates move toward each other. The actuator will be in the OFF state when the electrodes are at the same potential (shorted).

A DC voltage is theoretically capable of inducing the "ON" state of the actuation cycle. Practical problems, however, limit the application of a DC voltage for the actuation of some electrostatic actuators. In real devices, DC driving shows memory effects, such that the behavior of the actuators depends strongly on the history of the actuation process. DC driving also induces stiction (1) through charges injected in the dielectric at the dielectric/metal electrode interface, and (2) through charges trapped at the dielectric/air interface.

In our commonly owned copending application entitled DRIVING DEVICE AND METHOD FOR ELECTROSTATIC ACTUATORS, and having Ser. No. 08/948,337, a method and apparatus was proposed for use with an AC signal. The AC signal method of driving an electrostatic actuator was designed for actuators having a pair of actuator plates having electrodes for conducting a voltage potential thereto. At least one of the pair of actuator plates was movable with respect to the other, so that the actuator plates were positioned to move upon application of an AC voltage potential thereto by electrodes attached thereto. The driving device in this application produced a compounded AC signal with a rise section at least 10 to 100 times mechanical response time of the actuator and a fall time at least 10 to 100 times the mechanical response time of the actuator. Advantages of this invention are spelled out in the above referenced copending application. However, the invention worked best in driving arrays of actuators working in parallel.

Descriptions of various prior art patents are also contained therein and are incorporated herein by reference.

There are, however, possible array configurations where the individual cells have one common electrode but have to operate out of phase. If the common electrode is grounded, in order to generate alternate fields between the electrodes of the electrostatic actuator, a dual power supply is needed, providing positive and negative potentials. The relatively high voltages needed for use in electrostatic activators would expectedly involve the use of DC/DC converters to scale up the voltage supplied by a battery or another available voltage. These DC/DC converters are bulky and expensive.

Because of this, use of a single power supply would be of great advantage in designing electrostatic actuators, in part because favorable system size, weight and cost parameters would result. It would be of great advantage to the art to resolve the conflict for operating requirements for electrostatic actuators having different cells using a common electrode with an electrically floating potential.

It would be another great advance in the art if an improved driving method for electrostatic actuators could be provided with a desired alternate polarity fields to all the actuator cells based on a single DC power supply and a single DC/DC converter.

Other advantages will appear hereinafter.

SUMMARY OF THE INVENTION

It has now been discovered that the above and other advantages of the present invention may be realized in the following manner. Specifically, the present invention comprises an actuator drive for electrostatic actuators driven with alternate polarity fields, in which the cells have one shared electrode, and the power supply is a single DC power supply. The invention reverses the field polarity without using a second power supply, thereby substantially saving size and cost factors, such as in mesopumps where the membranes employ a single conductive layer.

The device is used in electrostatic actuators that have at least one pair of actuator plates and electrodes for conducting a voltage potential thereto. At least one of the pair is movable with respect to the other. The plates are positioned to move upon application of a voltage potential through the electrodes. A driving means provides a voltage potential to the electrodes to cause the movement of the at least one plate. In a typical cell configuration, an upper electrode and a lower electrode have a moveable diaphragm between them. DC voltage is selectively applied to the upper and lower electrodes and to the diaphragm, which is shared with both upper and lower electrodes. By the use of a properly selected time allocation, each electrode is driven from the same DC power supply for part of the cycle to produce alternate polarity fields at all times on each actuator.

The use of a alternate driving voltage, with zero continue component, provides a much improved driving scheme with reduction of charge injection and minimizes the power dissipation in touch-mode electrostatic actuators. The voltage may be derived from a square wave signal, but may also be of other wave forms such as arcuate, triangular, truncated triangular, and the like. The invention herein allows the driving of arrays of electrostatic actuators working out of phase with alternate fields using a single high voltage DC supply. This is distinguished over prior systems in which DC driving induces charging and premature failure of actuators, or when real AC driving is used based on dual power supplies. Increased reliability, reduced cost and size or volume is achieved.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The present invention provides an improved driving method for touch mode electrostatic actuators bassed on the use of a single DC power source. The actuator comprises a plurality of cells, such as the one shown in FIG. 1, connected as described below. The present invention operates with one cell, or arrays of any desired number of cells. Arrays having a three by three or four by four configuration are contemplated, as are actuators with 100 by 100 cells, or even many more, depending upon the intended use of the final product into which the electrostatic actuator is incorporated.

Figure 1:
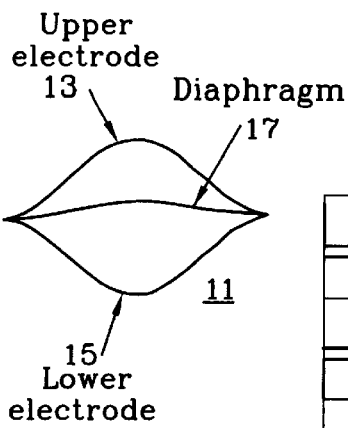
FIG. 1 is a schematic view of a typical single bi-directional electrostatic actuator cell useful in the present invention.

The invention is contemplated for use with any such actuator, made from any material, with any number of cells, in any configuration. The present invention relates to a driving strategy for non-parallel arrays of electrostatic actuators sharing a common electrode, and therefore the actual construction is shown in FIG. 1 only schematically. FIG. 1 illustrates the preferred cell, but it is fully within the scope of this invention to have an embodiment in which there is only one common electrode and one seperate electrode per cell.

As shown in FIG. 1, a cell 11 includes an upper electrode 13 and a lower electrode 15, which support a moveable or flexible diaphragm 17. The pair of electrode 13 and diaphragm 17 forms an actuator unit or pair, as does the pair of electrode 15 and diaphragm 17. In accordance with the present invention, an unipolar signal with reference to ground or to a common reference point is applied to electrodes 13 and 15, and to diaphragm 17, in a manner described below to cause a difference of potential between pairs. The actuator will be in the ON state when a potential difference is applied between the electrodes and will be in an OFF state when the electrodes are at the same potential.

Figure 2:
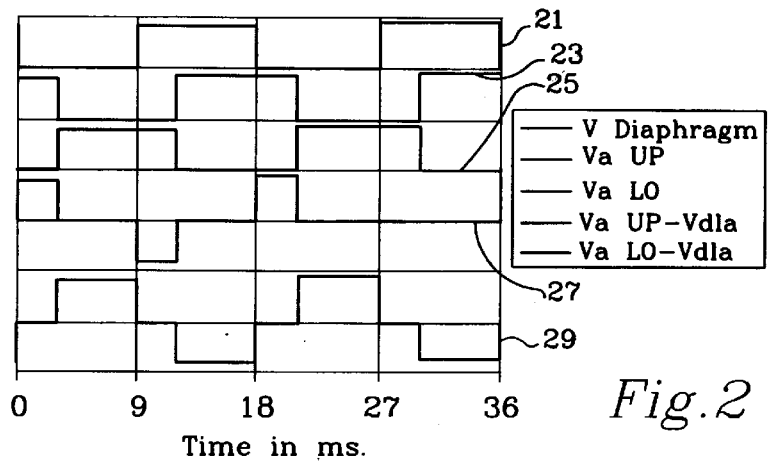
FIG. 2 is a graphical illustration of the voltage over time of the driving signal in the actuator cell shown in FIG. 1.

FIG. 2 illustrates the basic operation where unipolar, square wave signals are applied to electrodes 13 and 15 and to diaphragm 17 to drive the actuator. Adjustment of the actuation cycle, in milliseconds (ms), and the duty cycle, as a fraction of the total cycle, is made over an extremely wide range, depending on the application of the device. In FIG. 2, a positive or plus DC voltage 21 is applied to the diaphragm 17 with a period of 18 ms, and a duty cycle of 50%. At the same time, a similar positive voltage 23 is applied to the upper electrode 13 and delayed with three ms, versus the signal 21. This means that the signal 23 is 60° out of phase of signal 21. Also at the same time, the positive voltage 25 is applied to the lower electrode 15 with a delay of 12 ms versus signal 21, or with a phase shift of 240°.

As noted above, voltages 21, 23 and 25 all come from the same single DC power supply and all are positive with reference to the ground or common electrode of the power supply when not zero. However, the potential difference 27 between the upper electrode 13 and diaphragm 17 operates between a positive potential and a negative potential, as is the potential difference 29 between lower electrode 15 and diaphragm 17. Thus, even though the electrodes 13 and 15, and the diaphragm 17 are all driven with unipolar square-wave signals, with an amplitude depending on the application of course, the resulting field between actuators is bipolar.

Figure 3:
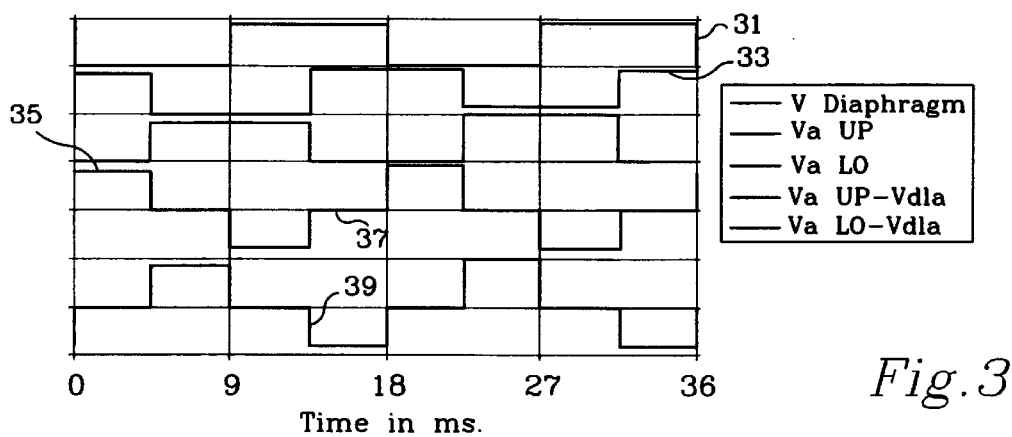
FIGS. 3–8 are graphical illustrations similar to that in FIG. 2, using different duty cycles and periods.

FIG. 3 illustrates a similar use of uni-polar square-wave signals 31, 33 and 35 to produce bipolar fields 37 and 39 between the actuator plates, this time with a different duty cycle of the bipolar signals 37 and 39. Other examples include square wave signals of periods of 10 to 100 ms, along with other fractional duty cycles.

Figure 4:
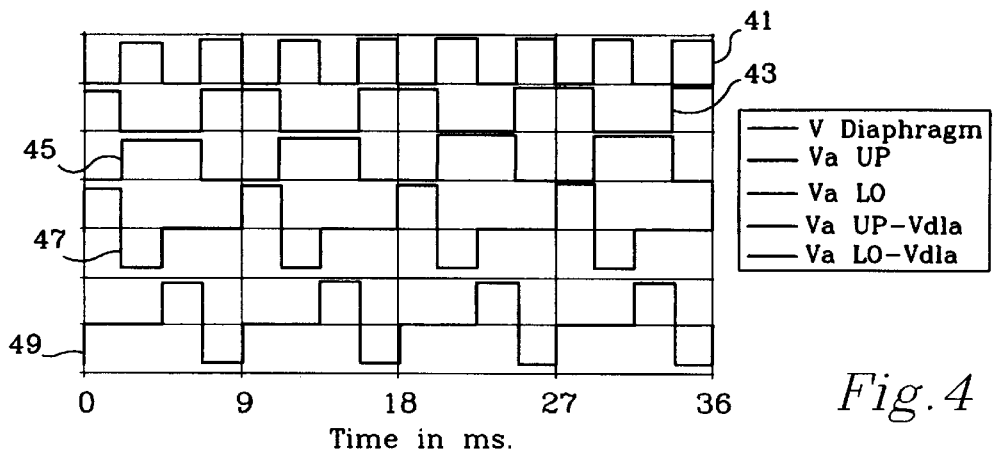
Figure 5:
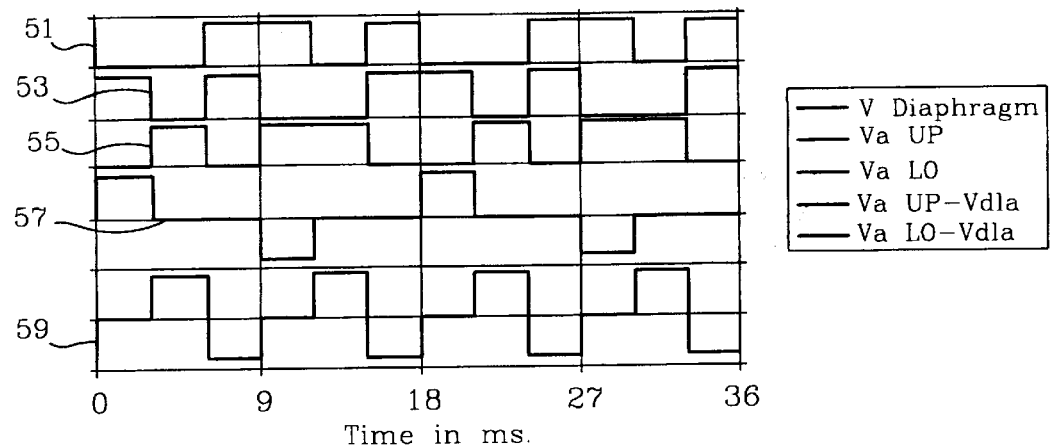
Figure 6:
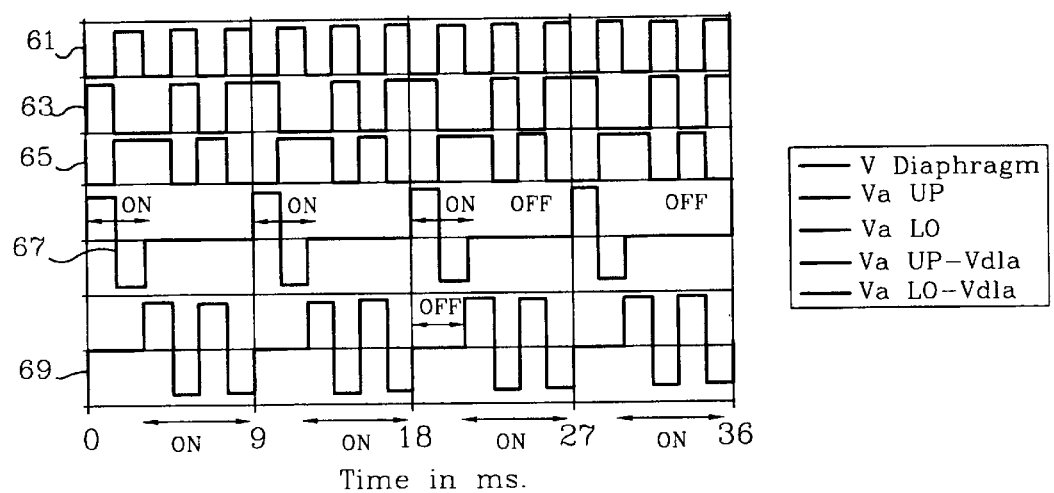

Turning now to FIGS. 4, 5 and 6, examples of other square wave signals as the ON signal are illustrated. In FIG. 4, as in all the embodiments of this invention where there is a common electrode formed by the diaphragm, the potential 41 of the diaphragm is either positive or zero. Potentials 43 and 45 from an appropriately selected square wave for the upper electrode and lower electrode, respectively, again produce bipolar potentials 47 and 49 between pairs of electrodes and the diaphragm as set forth above. Similarly, FIG. 5 uses positive and zero potential inputs to electrodes 51 and 53, and common electrode diaphragm 55, to result in bipolar potentials 57 and 59. Finally, FIG. 6 illustrates the same use of unipolar potentials on electrodes 61 and 63, with common diaphragm 65, to produce potentials 67 and 69 between the fixed and moveable actuator plates. In the case of FIG. 6, the ON condition for each actuator pair is realized with an actual square wave, AC signal.

Figure 7:
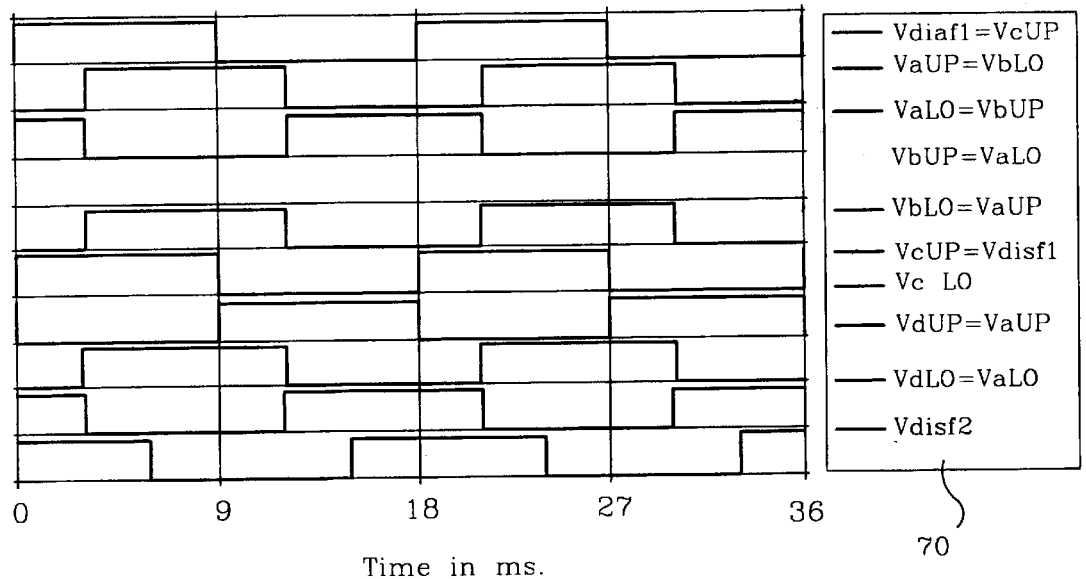

The signals defined in FIG. 7 are used to drive four cells of the type shown in FIG. 1 for a peristaltic mesopump application using a duty cycle of ⅓. The direction of the field on a particular cell is dictated by the phase difference between the signals on the involved electrodes. Electrodes Va, Vb, Vc and Vd, in both upper and lower relationships to the diaphragms, cooperate with diaphragms Vd1 and Vd2, to operate the mesopump. The legend 70 on the right side of the illustrated electrical potential cycles illustrates the cooperative relationship between the electrodes and diaphragms of the four cells.

Figure 8:
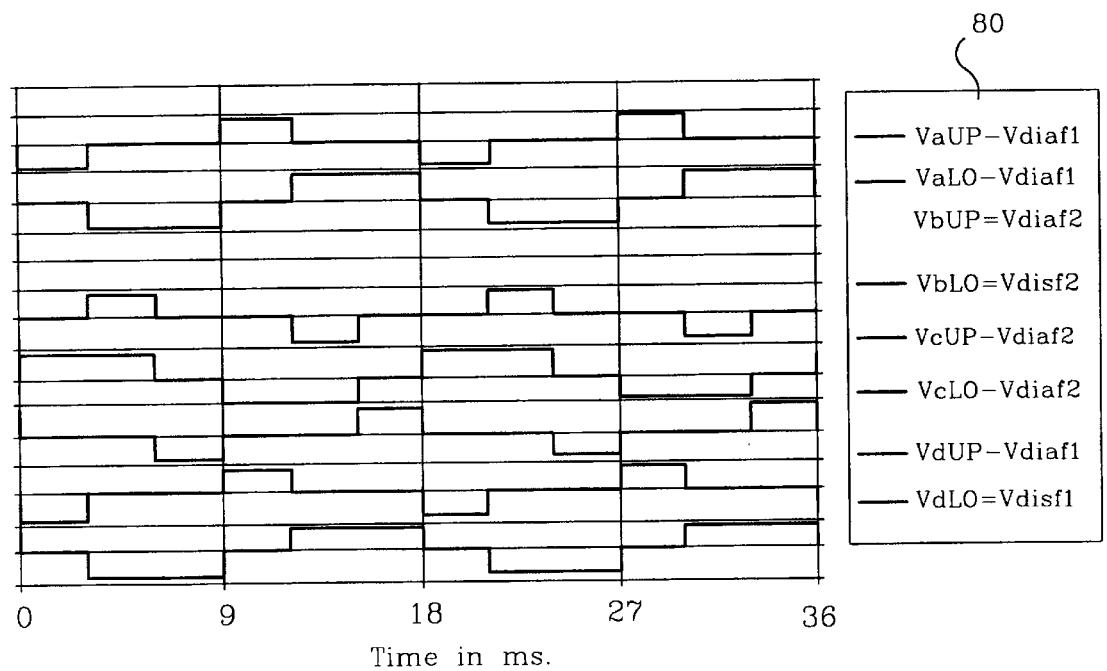
Figure 9:
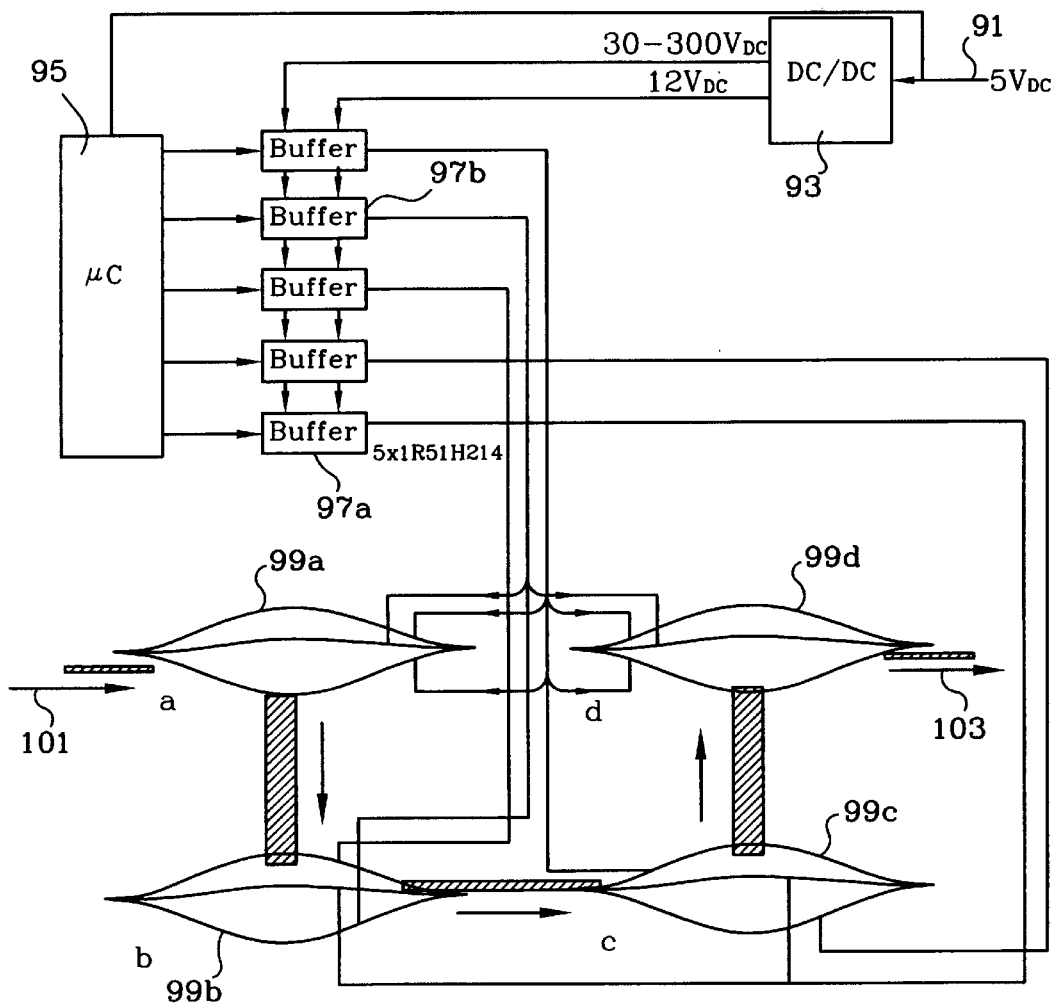
FIG. 9 is a schematic view of one circuit illustrating the use of four cells such as those shown in FIG. 1, being configured for a peristaltic mesopump application for a specific duty cycle.

The actual array is shown schematically in FIG. 9. It should be noted that this circuit of FIG. 9 is illustrative, and many other such circuits can be devised to accomplish the same or similar results, depending on the application to which the invention is put. In FIG. 9, a single five volt DC source 91 provides a potential to DC/DC converter 93. A microcontroller 95 feeds buffers 97 for actuation of cells 99a, 99b, 99c and 99d, as illustrated. Fluid enters the activator array of FIG. 9 at inlet 101 and cell 99a, then is passed to cells 99b, 99c and 99d in sequence, exiting by outlet 103. The generated driving signals have the period of 18 ms (~55 HZ) and a nominal amplitude of 40 volts for all of the electrodes and diaphragms. The direction of the field on a particular cell is dictated by the phase difference between the signals on the individual electrodes involved, as described with respect to FIG. 7. In addition, because there is a common electrode and the potential applied to each electrode, as shown in FIG. 7, is either positive or zero, the signals on each actuator of FIG. 9, for example, have the characteristics of an alternating or bi-polar form, shown in the legend 80 on the right side of FIG. 8 as each signal acts on each actuator. Buffer 97a provides a common voltage potential to the moveable diaphragms in cells 99a and 99d while buffer 97b provides a common voltage potential to the moveable diaphragms in cells 99b and 99c, such that the commonly driven diaphragms function as a common electrode with the first and second electrodes of each cell.

As will become apparent from the foregoing detailed description, the present invention is admirably suited for use in almost any electrostatic actuators. Of particular advantage in touch mode application, the invention is useful in electrostatic actuators used as valves, pumps, switches, shutters, wobble motors, mirrors, relays, linear actuators and many similar devices. Such devices will have a far superior ability to function and last over a longer period of time because of the present invention's ability to reduce stiction by selection of an optimum driving voltage. Again, it is intended that many wave forms are suitable for the present invention, though square wave signals have been used for purposes of illustration. It can readily be appreciated that other wave forms also provide relative potential between common electrodes in the same manner.

While particular embodiments of the present invention have been illustrated and described, it is not intended to limit the invention, except as defined by the following claims.

What is claimed is:

1. An electrostatic actuator array having a plurality of individual cells sharing a common electrode, said cells each comprising:

first and second electrodes separated by a distance and having a moveable diaphragm mounted there between for conducting a voltage potential thereto, said moveable diaphragm being a common electrode with said first and second electrodes to form a pair of actuator units said pairs of actuator units being positioned to move upon application of a voltage potential thereto; and a voltage source operably connected for selectively providing a repeating cycle of voltage potential to said first and second electrodes and said moveable diaphragm to cause said movement, said voltage source producing an alternate polarity field generated from a single DC power supply by applying a zero voltage component and a DC voltage component to said first and second electrodes and said moveable diaphragm at different times in said repeating cycle to produce said alternate polarity field.

2. The actuator array of claim 1, wherein said diaphragm, first electrode and second electrode are all driven by uni-polar square wave signals.

3. The actuator array of claim 1, wherein said alternate polarity field is derived from a DC power supply having time allocation of signals to present alternating fields to each of said first and second electrodes a nd said diaphragm.

4. The actuator array of claim 1 wherein at least one of said array configuration operates out of phase with at least one adjoining cell.

5. The actuator array of claim 1, wherein said plurality of cells n cells and includes 2n electrodes, where n is an integer of at least 2.

6. The actuator array of claim 5, wherein said n cells work out of phase with said 2n electrodes and are driven with n+1 unipolar signals.

7. In a touch-mode electrostatic actuator having a plurality of individual cells sharing a common electrode, said cells each having first and second electrodes separated by a distance and having a moveable diaphragm mounted there between for conducting a voltage potential thereto, said moveable diaphragm being a common electrode with said first and second electrodes to form a pair of actuator units, said pairs of actuator units being positioned to move upon application of a voltage potential thereto, the improvement comprising:

a driving means comprising a voltage source for selectively providing a repeating cycle of voltage potential to said first and second electrodes and said moveable diaphragm to cause said movement, said voltage source producing an alternate polarity field generated from a single DC power supply by applying a zero voltage component and a DC voltage component to said first and second electrodes and said moveable diaphragm at different times in said repeating cycle to produce said alternate polarity field.

8. The driving means of claim 7, wherein said diaphragm, first electrode and second electrode are all driven by uni-polar square wave signals.

9. The driving means of claim 7, wherein said alternate polarity field is derived from a DC power supply having time allocation of signals to present alternating fields to each of said first and second electrodes and said diaphragm.

10. The driving means of claim 7 wherein at least one of said array configuration operates out of phase with at least one adjoining cell.

11. The driving means of claim 7, wherein said plurality of cells comprises n cells and includes 2n electrodes, where n is an integer of at least 2.

12. The driving means of claim 11, wherein said n cells work out of phase with said 2n electrodes and are driven with n+1 unipolar signals.

13. A method of driving an electrostatic actuator array having a plurality of individual cells sharing a common electrode comprising:

providing first and second electrodes separated by a distance and having a moveable diaphragm mounted there between for conducting a voltage potential thereto, said moveable diaphragm being a common electrode with said first and second electrodes to form a pair of actuator units, said pairs of actuator units being positioned to move upon application of a voltage potential thereto; and providing a voltage source operably connected for selectively providing a repeating cycle of voltage potential to said first and second electrodes and said moveable diaphragm to cause said movement, said driving means producing an alternate polarity field generated from a single DC power supply by applying a zero voltage component and a DC voltage component to said first and second electrodes and said moveable diaphragm at different times in said repeating cycle to produce said alternate polarity field.

14. The method of claim 13, wherein said diaphragm, first electrode and second electrode are all driven by uni-polar square wave signals.

15. The method of claim 13, wherein said alternate polarity field is derived from a single DC power supply having time allocation of signals to present alternating fields to each of said first and second electrodes and said diaphragm.

16. The method of claim 13 wherein at least one of said array configuration operates out of phase with at least one adjoining cell.

17. The method of claim 13, wherein said plurality of cells comprises n cells and includes 2n electrodes, where n is an integer of at least 2.

18. The method of claim 17, wherein said n cells work out of phase with said 2n electrodes and are driven with n+1 unipolar signals.

* * * * *